United States Patent [19]

Oishi et al.

[11] Patent Number: 4,633,354
[45] Date of Patent: Dec. 30, 1986

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 602,613

[22] Filed: Apr. 20, 1984

[30] Foreign Application Priority Data

Apr. 26, 1983 [JP]  Japan .............................. 58-61452[U]

[51] Int. Cl.$^4$ ...................... G11B 23/02; G11B 15/32; G11B 23/04; G03B 1/04
[52] U.S. Cl. .................................... 360/132; 360/137; 242/198
[58] Field of Search ................... 360/93, 95, 132, 134, 360/94, 137; 242/198

[56] References Cited

U.S. PATENT DOCUMENTS

| 3,797,779 | 5/1974 | Esashi et al. | 360/95 |
| 4,093,967 | 6/1978 | Satou et al. | 360/132 |
| 4,130,848 | 12/1978 | Amano et al. | 360/93 |
| 4,185,307 | 1/1980 | Sato | 360/94 |

FOREIGN PATENT DOCUMENTS

| 52-76007 | 6/1977 | Japan | 360/95 |
| 58-94174 | 6/1983 | Japan | 360/132 |
| 1032777 | 6/1966 | United Kingdom | 360/93 |

OTHER PUBLICATIONS

IBM Technical Disclosure Bulletin, vol. 10, No. 11, Apr. 1968, pp. 1743-1744, "Tape Cassette", C. J. Rocca.

Primary Examiner—A. J. Heinz
Assistant Examiner—Alfonso Garcia
Attorney, Agent, or Firm—Sughrue, Mion, Zinn, Macpeak & Seas

[57] ABSTRACT

A Phillips-type magnetic tape cassette capable of use in the applications of an ordinary tape cassette and also in applications for high-density recording where the tape must be pulled out of the cassette for recording and playing. A front opening defined by a single hole is provided in the body of the tape cassette. The front opening has cuts extending to the front of the cassette from slots which define portions of reference holes. A frame member having apertures for receiving the magnetic head and tape guides is detachably engaged with the cassette body in the opening. The frame member has protrusions which, when engaged with the cuts, form the reference holes.

5 Claims, 2 Drawing Figures

MAGNETIC TAPE CASSETTE

BACKGROUND OF THE INVENTION

The present invention relates to magnetic tape cassettes. More particularly, the invention relates to an improvement of a reel-to-reel type magnetic tape cassette, or a so-called Phillips-type magnetic tape cassette, in which a magnetic tape wound on a pair of winding cores is loaded between the upper and lower halves.

Magnetic tape cassettes are extensively employed for recording and reproducing audio signals. There has been a consistent demand for cassettes of high quality, namely, cassettes suitable for recording and reproducing signals with a high density and which have a long playing time.

Recently, digital recording systems such as the pulse code modulation (PCM) system have been employed for recording audio signals. In such a system, the signal recording density is very high. For instance, thirty-two tracks are typically formed on a tape having a width of 3.75 mm. Accordingly, the width of one track is of the order of 50 to 100 microns. That is, the width of each track is a fraction of the width of each track in a conventional recording system in which four tracks are formed on a tape.

Accordingly, in a conventional system of engaging a magnetic head with a tape in an audio apparatus, that is, in a signal recording and reproducing system in which a magnetic head is inserted into a cassette through its front opening, tracking error is liable to occur because the positioning accuracy of the head and the tape is low.

On the other hand, a system is known in which, as in a conventional video tape cassette, the tape is pulled out of the cassette to be engaged with the magnetic head. In this system, the head and the tape can be positioned accurately. However, if the front opening of the conventional Phillips-type cassette is made larger so that the tape can be pulled out, the cassette cannot be interchanged with a conventional audio signal recording and reproducing cassette. Thus, the range of its application is limited.

SUMMARY OF THE INVENTION

In view of the foregoing, an object of the invention is to provide a magnetic tape cassette in which the tape can be pulled out of the front opening, and which is interchangeable with the conventional Phillips-type cassette.

The foregoing object and other objects of the invention have been achieved by the provision of a magnetic tape cassette having a pair of reference holes near the front opening thereof which extend vertically through the cassette, in which, according to the invention, the front opening is a single hole having cuts extending to the front of the cassette from the reference holes. A frame member having a plurality of holes for receiving a magnetic head and tape guides is detachably engaged with the opening. The frame member has protrusions which, when engaged with the cuts, form the reference holes.

DESCRIPTION OF THE PREFERRED EMBODIMENTS

An example of a magnetic tape cassette according to the invention will be described with reference to the accompanying drawings.

Figure 1:
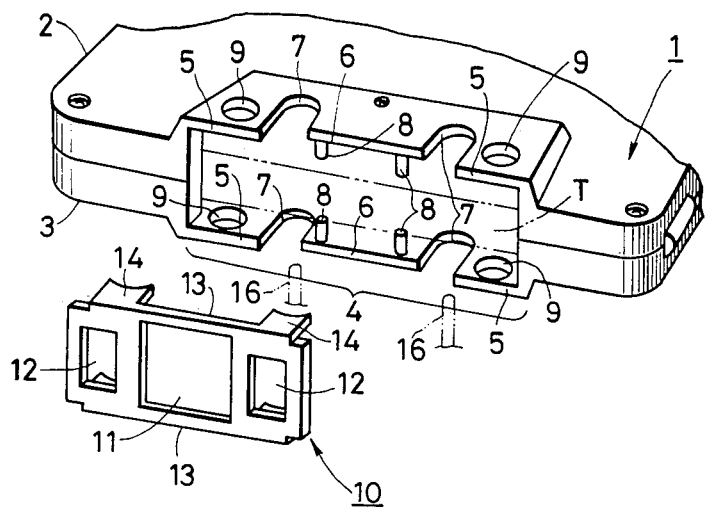
FIG. 1 is an exploded perspective view showing the front opening and its relevant components of an example of a magnetic tape cassette constructed according to the invention.

FIG. 1 is an exploded perspective view showing the front opening of a cassette according to the invention. Similar to a conventional Phillips-type cassette, a magnetic tape T wound on a pair of winding cores (not shown) is loaded in the cassette 1, extending across the front opening 4. The cassette 1 has capstan holes 9 which are the same as those of the conventional cassette. In addition, almost all the dimensions of the cassette 1 are the same as those of the conventional cassette.

The front opening 4 is a rectangular hole which is formed by combining the upper and lower halves 2 and 3, having upper and lower edges 5. Cuts 7 are formed in each of the upper and lower halves 2 and 3 extending from the respective edges 5 on both sides of the center of the edge 5 and between the capstan holes 9. In other words, the cuts 7 merge with the cassette positioning reference holes which are formed as in the conventional cassette. Accordingly, the cuts 7 have a width equal to the diameter of the reference holes, and their extended ends are semicircular in shape. The part of each edge 5 defined between the two cuts 7 is a set-back edge 6 which is set back from the other parts of the edges 5 by a distance equal to the thickness l₂ of a frame member 10 (described later).

Cylindrical pins 8 extend from the inner surfaces of the upper and lower halves 2 and 3. More specifically, two pins 8 are provided near both ends of each edge 6 with the two pins 8 on the upper half 2 being aligned with the two pins 8 on the lower half 3.

The aforementioned tape T may be a metal tape or a vacuum deposition tape which is suitable for recording and reproducing signals with a high density.

As in the conventional cassette, a shield plate, a pressurizing pad, etc. (not shown) are arranged behind the tape t, which is laid in such a manner as to extend across the front opening 4.

In the cassette 1 having the large front opening 4 and the cuts 7 as described above, when the cassette is loaded into a recording and reproducing apparatus (not shown), the guide arms 16 for pulling out the tape are inserted into the cuts 7 to move forwardly of the cassette. As a result, the tape T is partially pulled out of the cassette. The tape T thus pulled out is set in place near the magnetic head (not shown) by the positioning member of the recording and reproducing apparatus so that it is accurately confronted with the magnetic head.

The frame member 10 to be engaged with the front opening is substantially rectangular. The frame member 10 has a rectangular hole 11 for receiving the magnetic head (not shown) at the center, and two rectangular holes for receiving tape guides (not shown) on both sides of the rectangular hole 11.

The frame member 10 includes upper and lower edges 13 and protrusions 14 near both ends of each edge 13. The protrusions 14 extend in one direction perpendicular to the body of the frame member 10 so that, when the frame member 10 is engaged with the front opening, the protrusions 14 occupy the front parts of the cuts 7. The end of each protrusion 14 is curved inwardly so that it is substantially semicircular. Accordingly, when the frame member 10 is engaged with the front opening 4, the semicircular ends of the protrusions 14 and the semicircular ends of the cuts 7 form the reference holes, which are substantially circular. Four corners of the frame member 10, which are outside the protrusions 14 are recessed vertically by an amount equal to the thickness of the edges 5 of the front opening 4.

Figure 2:
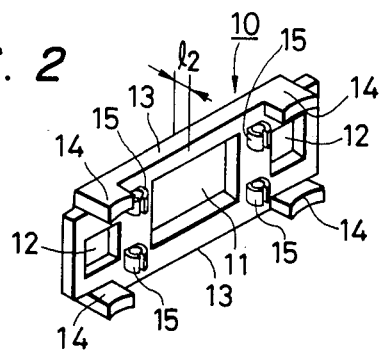
FIG. 2 is a perspective view showing the inside of a frame member in the cassette according to the invention.

FIG. 2 shows the inside of the frame member 10. As shown in FIG. 2, the frame member 10 has holding parts 15 on the inside and between the rectangular holes 11 and 12. When the cassette is assembled, the pins 8 are inserted into the holding parts 15. That is, each holding part 15 is curved so as to hold the respective cylindrical pin 8 from both sides, and is integral with the frame member 10. When the holding parts 15 are pushed against the respective pins 8, the holding parts 15 are caused to hold the pins 8, as a result of which the frame member 10 is engaged with the front opening 4. Rectangular holes for receiving the erasing magnetic head and the capstan roller are formed on both sides of the rectangular hole 11. Thus, the cassette of the invention can be used in all applications of a conventional cassette. The frame member 10 can readily be engaged with and disengaged from the opening because it is made of a plastic resin which is elastic to some extent.

As is apparent from the above description, in the cassette 1 according to the invention, the frame member 10 can be freely engaged with and disengaged from the front opening 4. When the frame member 10 is removed therefrom, the tape T can be partially pulled out of the opening 4. Thus, the cassette is suitable for recording and reproducing signals with a high density. When the frame member 10 is engaged with the opening 4, the cassette is interchangeable with the conventional cassette.

What is claimed:

1. In a magnetic tape cassette having a pair of reference holes near a front opening provided in a front surface thereof, which holes extend through said cassette, the improvement wherein:
    said front opening comprises a single hole opening, said single hole opening including cut portions extending toward the front surface of said cassette from said reference holes, and
    a frame member having a plurality of holes for receiving a magnetic head and tape guides, and means for detachably engaging said frame member within said opening, said frame member having protrusions which, when engaged with said cut portions, form forward peripheries of said reference holes, said frame member being removable from said opening to permit withdrawal of the magnetic tape within said cassette when said tape is employed with a tape player of a type requiring tape withdrawal, and being engageable within said opening when said tape is to be employed with a tape player of a type not requiring tape withdrawal.

2. The magnetic tape cassette of claim 1, wherein portions of edges defining said front opening are recessed, in a frame member accommodation region, by a distance equal to a thickness dimension of said frame member.

3. The magnetic tape cassette of claim 1, wherein said engaging means comprises cylindrical pins extending within said cassette at locations between said reference holes, and frame member holding parts for selectively connecting said frame member to said cylindrical pins.

4. The magnetic tape cassette of claim 1, wherein said protrusions of said frame member are curved inwardly at ends thereof such that said reference holes are substantially circular in cross section.

5. The magnetic tape cassette of claim 4, wherein corners of said frame member are recessed to fit within edge portions of said cassette adjacent corresponding ones of said reference holes.

* * * * *